Sept. 23, 1952     B. L. JOHNSON     2,611,222
ROUGHING AND FINISHING TOOL
Filed April 29, 1949     2 SHEETS—SHEET 1
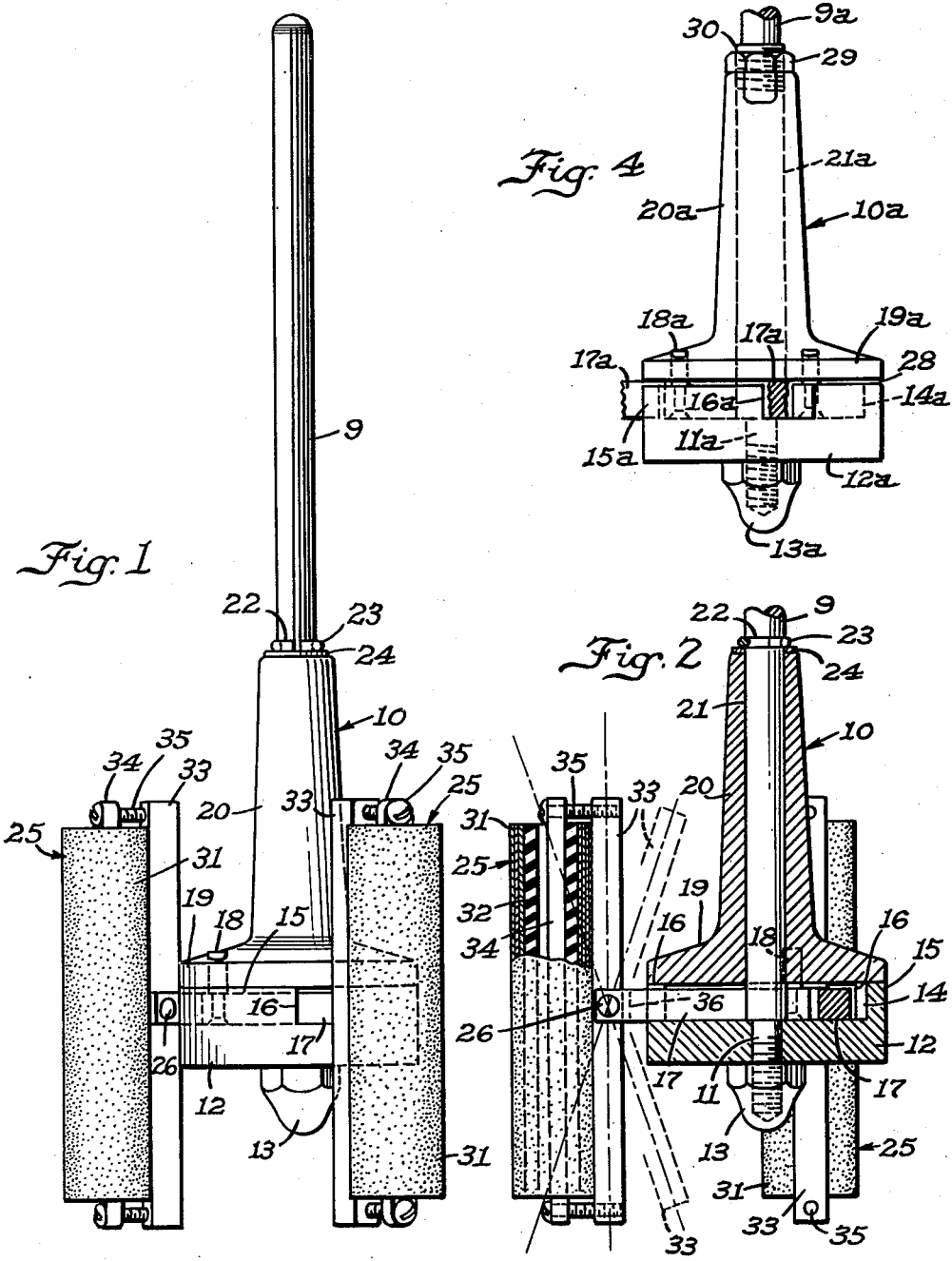
Inventor
Berd L. Johnson
Andrew F. Wintercorn
Atty Sept. 23, 1952   B. L. JOHNSON   2,611,222
ROUGHING AND FINISHING TOOL
Filed April 29, 1949   2 SHEETS—SHEET 2
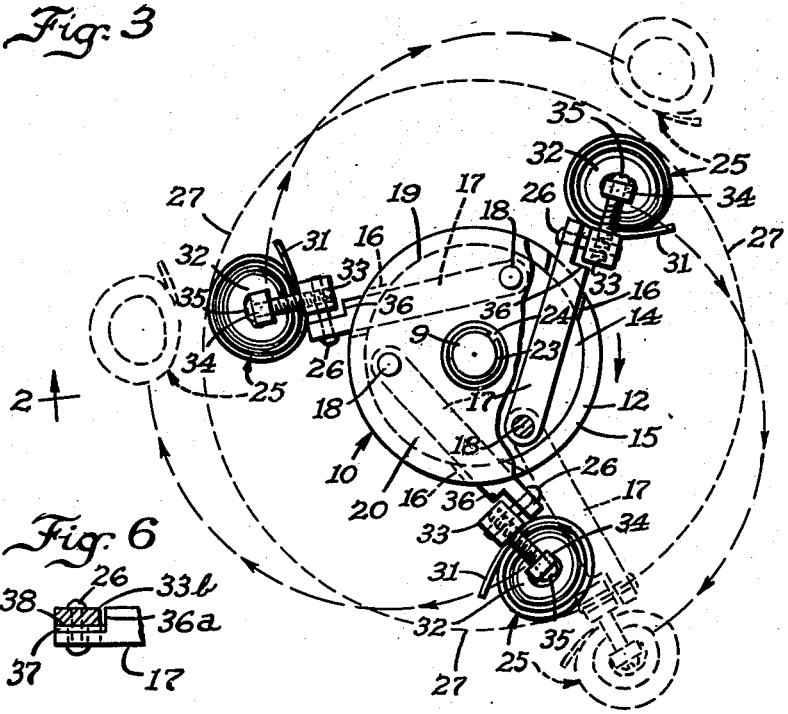
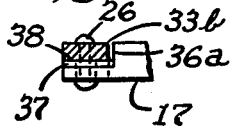
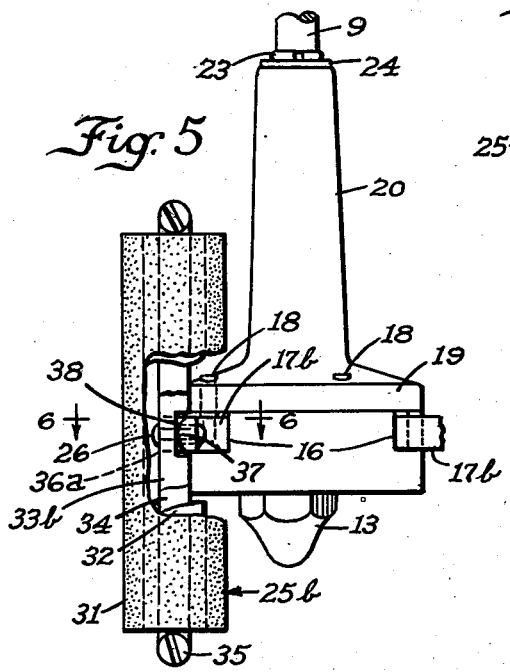
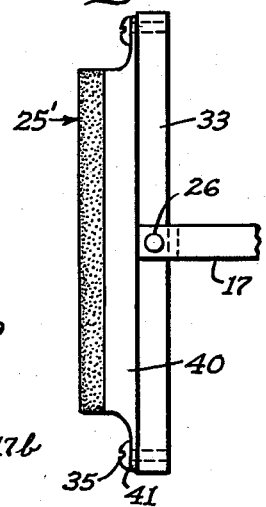
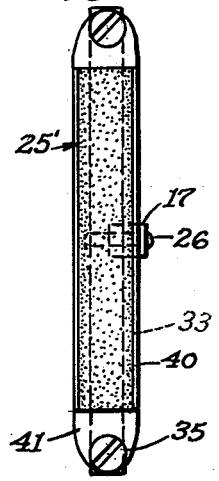

Patented Sept. 23, 1952

2,611,222

UNITED STATES PATENT OFFICE 2,611,222

ROUGHING AND FINISHING TOOL

Berd L. Johnson, Billings, Mont.

Application April 29, 1949, Serial No. 90,365

19 Claims. (Cl. 51—184.1)

This invention relates to a new and improved roughing and finishing tool, especially designed and adapted for use in engine cylinder jobs known as "glaze busting," namely the removal of the glaze in the bores so that new piston rings may wear down quickly to a correct close fit.

The roughing and finishing tools heretofore available, when of the type using emery or other metal working cloth as the abrasive, commonly referred to as "metal cloth" usually were objectionable because of the difficulty of replacing the metal cloth when worn out. It is, therefore, one of the principal objects of my invention to provide a bore finishing tool of a more practical design, in which hones of a new design are provided to facilitate replacement of metal cloth, each hone unit comprising a roll of metal cloth wound on a tubular rubber core and arranged to be clamped to a carrier bar by means of a clamp bar slipped through the tubular core piece and detachably and adjustably secured at its ends to the carrier bar by screws, so that the cloth roll may first be freed by loosening the screws and then turned to pay out the worn out end portion, which can be cut or torn off after the screws have been tightened again to clamp the roll in its adjusted position, this construction and mode of adjustment reducing waste to a minimum and enabling most economical use of the metal cloth.

Another important object of my invention is to provide a tool of the kind described in which the metal cloth rolls used as hones are interchangeable with pieces of carborundum or other similar grinding or honing material, the supporting back plates of which are designed to be fastened to the carrier bar by means of the same screws otherwise used for fastening the clamping bar for the roll of "metal" cloth.

Finally, and considered to be the most important, it is another object of my invention to provide a tool of the kind described, the spindle of which is designed to be driven by insertion in the chuck of an electric drill or similar portable hand tool, said spindle extending into a rotary honing head or hub member where it is connected by means of a rotary plate with a plurality of hone supporting arms that are slidably guided intermediate their ends in the head for radial movement and pivotally attached at their inner ends to the rotary plate, so that when the tool is entered in an engine cylinder bore and the electric motor is started, the arms, weighted by the hones which act as flyweights, are thrown outwardly automatically under centrifugal force to allow the hones to move into working contact with the cylinder walls and then hold them there under the torque of the motor. While the mode of operation just outlined is generally preferred for reasons believed to be obvious, it is also possible, with a small change in construction, to set all of the arms simultaneously at a desired radius for operation in a certain sized bore and clamp the same simultaneously in such adjusted relationship to the honing head.

The hone units are loosely pivotally connected at the mid-points of their carrier bars to the outer ends of the revolving arms in T-arrangement so that the hones are free to adjust themselves to be certain of full length engagement with the cylinder walls for efficient honing regardless of the position of the driven spindle which at times will not be held truly coaxially of the bore.

The invention is illustrated in the accompanying drawings, in which

Fig. 1 is a side view of a roughing and finishing tool made in accordance with my invention;

Fig. 2 is a vertical section on line 2—2 of Fig. 3;

Fig. 3 is a plan view of Fig. 1, showing a portion of the head broken away better to illustrate the construction and including a dotted line projected position of one of the arms to illustrate the expansibility of the tool to work in bores of various sizes within a certain range, depending, of course, upon the size of the tool, tools of small, medium and large size being furnished to take care of the whole range of engine cylinders;

Fig. 4 is a side view of the head or hub portion of another roughing and finishing tool of my invention, showing a modified or alternative construction insofar as the provision of means for adjustably clamping the hone supporting arms is concerned;

Fig. 5 is a fragmentary side view of another roughing and finishing tool of my invention, showing a modified or alternative construction insofar as the loose rocker mounting of the hones on their co-operating arms is concerned;

Fig. 6 is a sectional detail on line 6—6 of Fig. 5, and

Figs. 7 and 8 are a side and front view, respectively, of a Carborundum or other stone hone showing how it may be fastened interchangeably on the same carrier bars used with the rolls of "metal" cloth provided as hones on the tools in the other figures.

Similar reference numerals are applied to corresponding parts in the various views.

Referring first to Figs. 1–3, the reference numeral 9 designates the drive spindle of the roughing and finishing tool of my invention indicated generally by reference numeral 10. The spindle 9 is adapted to be entered in the chuck of an electric drill or similar portable hand tool. On the lower reduced threaded end 11 a circular plate 12 is fastened by means of a nut 13. Plate 12 is recessed, as shown at 14, defining a peripheral upwardly projecting flange 15 in which three slots 16 are provided in circumferentially spaced relation, 120° apart. Slots 16 serve as guides for the intermediate portions of arms 17 that are pivoted at their inner ends, as at 18, on the flanged lower end portion 19 of the rotary hub or head 20. The arms 17 are free to oscillate in recess 14 around pins 18 as pivots so as to project to varying degrees through slots 16, the dotted line position of the one arm in Fig. 3 being an extreme position. Spindle 9 is disposed on the longitudinal axis of the head 20 and extends freely through an axial bearing hole 21 provided in said head and has an annular groove 22 provided therein, in which a split snap ring 23 is received to prevent upward displacement of the hub; a washer being preferably inserted between the ring 23 and the upper end of the head. Hone units 25 or 25' (Figs. 7-8) pivoted as at 26 on the outer ends of arms 17 in right angle or T-arrangement with respect thereto act as flyweights when the electric motor to which the spindle is attached is started. The driving torque is transmitted from spindle 9 to plate 12 to drive the assembly in a clockwise direction as indicated by the arrow in Fig. 3. However, inasmuch as the arms 17 are pivoted to the head 20 at 18 and the plate 12 is free to turn relative to the head and as the driving torque is transmitted directly to it and it has sliding contact at 16 with the arms 17, it is easy to see that the arms 17 will be swung outwardly, each swinging in a clockwise direction around its pivot 18. It must be remembered however, that the hone units act as flyweights the moment the assembly is turned, and, consequently, they are also thrown outwardly under centrifugal force, the force bearing a predetermined relationship to the R. P. M. of the spindle 9. The hones are therefore held in close working contact with the cylinder walls indicated by the dotted line circle 27 in Fig. 3.

Fig. 4 shows a modified or alternative construction in which all corresponding parts are numbered similarly, spindle 9a, instead of 9, and so on. A clearance is left at 28 between the top of flange 15a and bottom of flange 19a so that the arms 17a may be clamped between the plate 12a and head 20a by the tightening of a nut 29 that threads on the threaded portion 30 of spindle projecting from the top of head 20a. A lock washer or a lock nut may be provided in combination with nut 29 to prevent its loosening accidentally. This construction enables setting the arms 17a simultaneously at a desired operating radius for operation of the hones 25 or 25' in a certain sized bore with a predetermined light, medium, or heavy working pressure, and clamping the arms in such adjusted relationship to the head.

Each hone unit 25 comprises a strip 31 of "metal" cloth or other suitable flexible sheet abrasive wound into the form of a tight roll on a rubber tube 32 as a core with the abrasive face on the outside. That much will be sold as a replacement part and can be made available at a low price. The roll with its core piece is clamped onto a carrier or cross-bar 33 by entering a clamp bar 34 through the core and fastening the ends of the bar 34 to the ends of bar 33 by screws 35. The rubber tube 32 serves two important purposes aside from being merely a tubular core or mandrel upon which to wind the metal cloth, namely, (1) that of affording the needed resilience in the clamping of the roll to the bar 33, as best shown in Fig. 2, so that there will be no likelihood of the screws 35 loosening when once properly tightened, and (2) that of affording the desired amount of yield and resilience in the engagement of the roll with the cylinder wall, as should also be clear from a study of Fig. 2. Each arm 17 has a rabbet cut on the outer end as indicated at 36 to accommodate the associated carrier bar 33 for a loose pivoted connection on a rivet 26, allowing the amount of oscillation indicated by the dotted line positions in Fig. 2, whereby the hones are free to adjust themselves to the cylinder walls regardless of the deviation of the spindle 9 from an axial position in the bore. The rivets 26 are also loose in their holes in the arms 17 and bars 33 so that the hones may also adjust themselves in a plane at right angles to the arms, transversely relative to the plane of angular adjustment just referred to. The joints at 26, in other words, must have universal action. With that in mind I may, as shown at 37 in Figs. 5 and 6, give the side face of the rabbet 36a a crown formation so that easier rocking action of the hone 25b is possible in a plane at right angles to the arm 17b, with the same facility for pivotal movement about the rivet 26 as in the other construction. It will, in passing, be noticed at 38 in Fig. 5 that the hone carrier bar 33b is notched out to half its thickness to accommodate the rabbeted end 36a of the arm 17b, so that the ends of notch 38 limit the rocking movement of hone 25b in one plane and the inner end of rabbet 36a limits the rocking movement in the plane at right angles.

In conclusion, it will be seen in Figs. 7 and 8 how the Carborundum hones 25', which are mounted in channel shaped sheet metal back plates 40, are designed to be used on the same carrier bars 33 as hones 25, using preferably the same screws 35 entered through holes in the lugs 41 formed on the ends of the back plates 40 from the web portions of the channels thereof. In this way one may easily use "metal" cloth hones on certain jobs and switch to stone hones on other jobs. It goes also without saying that, if desired, the hone on one of the three arms of the tool may be omitted and a felt or other suitable wiper used on that arm to clean off grit and released particles of emery and steel in the course of a honing operation. It should also be clear that, while the mechanical movement is shown embodied in the present tool for honing it may be used for various other purposes wherever the expansibility feature is needed.

It is believed the foregoing description conveys a good understanding of the objects and advantages of my invention. The appended claims have been drawn to cover all legitimate modifications and adaptations.

I claim:

1. In a tool of the character described, a rotatable circular head, a circular plate in assembled coaxial relation to said head and adapted to turn with respect thereto, a drive spindle for the tool extending through a central axial bearing in said head and secured to said plate, elongated arms pivoted at their inner ends on said head at circumferentially spaced points that are spaced radially outwardly from the longitudinal axis of said head for oscillation and projectionable outwardly from the head, abrading devices of elongated form disposed substantially parallel to the longitudinal axis of the head and pivotally mounted intermediate their ends on and weighting as flyweights the outer ends of said arms, and guides on the peripheral portion of said plate slidably abutting the intermediate portions of said arms.

2. A tool, as set forth in claim 1 including means securing the plate against turning relative to said head from a selected angularly adjusted position of rotation relative to said head.

3. A tool as set forth in claim 1 wherein said arms are disposed between said head and said plate, said tool including means fastening said plate against turning relative to said head from a selected angularly adjusted position of rotation relative to said head and so as to clamp said arms frictionally on the top and bottom surfaces thereof in an adjusted position.

4. A tool as set forth in claim 1 wherein said arms are disposed between said head and said plate, said tool including means fastening said plate against turning relative to said head from a selected angularly adjusted position of rotation relative to said head and so as to clamp said arms frictionally on the top and bottom surfaces thereof in an adjusted position, said means comprising a nut threaded on said spindle and arranged to jam against the end of said head remote from said plate and arms, whereby to draw the plate toward said head by means of said spindle.

5. A device of the kind described comprising a head formed to provide an elongated central axial bearing with an annular flange on one end, a drive spindle having a working fit in and extending through said bearing, a circular plate fixed on the projecting end of said spindle in coaxial relation to the spindle and head and having an annular flange on its edge portion projecting toward and abutting the flange on said head and having slots provided therein in circumferentially spaced relation, elongated arms pivoted at their inner ends on the flange portion of said head at circumferentially spaced points that are spaced radially outwardly from the longitudinal axis of the head, said arms being slidable intermediate their ends in and extending through said slots as guides, and abrading devices of elongated form disposed substantially parallel to the longitudinal axis of the head and pivotally mounted intermediate their ends on and weighting the outer ends of said arms as flyweights.

6. A device of the kind described comprising a head formed to provide an elongated central axial bearing with an annular flange on one end, a drive spindle having a working fit in and extending through said bearing, a circular plate fixed on the projecting end of said spindle in coaxial relation to the spindle and head and having an annular flange on its edge portion projecting toward the flange on said head and having slots provided therein in circumferentially spaced relation, elongated arms pivoted at their inner ends on the flange portion of said head at circumferentially spaced points that are spaced radially outwardly from the longitudinal axis of the head, said arms being slidable intermediate their ends in and extending through said slots as guides, abrading devices of elongated form disposed substantially parallel to the longitudinal axis of the head and pivotally mounted intermediate their ends on and weighting the outer ends of said arms as flyweights, and means securing said plate against turning relative to said head whereby to fix the arms so as to hold the abrading devices in a selected radially adjusted position.

7. A device of the kind described comprising a head formed to provide an elongated central axial bearing with an annular flange on one end, a drive spindle having a working fit in and extending through said bearing, a circular plate fixed on the projecting end of said spindle in coaxial relation to the spindle and head and having an annular flange on its edge portion projecting toward the flange on said head and having slots provided therein in circumferentially spaced relation, elongated arms pivoted at their inner ends on the flange portion of said head at circumferentially spaced points that are spaced radially outwardly from the longitudinal axis of the head, said arms being slidable intermediate their ends in and extending through said slots as guides, abrading devices of elongated form disposed substantially parallel to the longitudinal axis of the head and pivotally mounted intermediate their ends on and weighting the outer ends of said arms as flyweights, and means fastening said plate to said head against turning relative to it and so as to clamp said arms frictionally on the top and bottom surfaces thereof between said head and plate in adjusted position.

8. A device of the kind described comprising a head formed to provide an elongated central axial bearing with an annular flange on one end, a drive spindle having a working fit in and extending through said bearing, a circular plate fixed on the projecting end of said spindle in coaxial relation to the spindle and head and having an annular flange on its edge portion projecting toward the flange on said head and having slots provided therein in circumferentially spaced relation, elongated arms pivoted at their inner ends on the flange portion of said head at circumferentially spaced points that are spaced radially outwardly from the longitudinal axis of the head, said arms being slidable intermediate their ends in and extending through said slots as guides, abrading devices of elongated form disposed substantially parallel to the longitudinal axis of the head and pivotally mounted intermediate their ends on and weighting the other ends of said arms as flyweights, and means fastening said plate to said head against turning relative to it and so as to clamp said arms frictionally on the top and bottom surfaces thereof between said head and plate in adjusted position, said means comprising a nut threaded on said spindle and arranged to jam against the end of said head remote from said plate and arms, whereby to draw the plate toward said head by means of said spindle.

9. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, elongated carrier bars loosely pivoted at their mid-points to the outer ends of said arms, a roll of abrasive sheet material associated with each of said carrier bars, and an elongated clamp bar extending through each roll and receiving means fastening the ends thereof adjustably to the ends of the associated carrier bar to clamp the roll.

10. A tool as set forth in claim 9 including a tubular core in each roll made of compressible resilient material, said clamp bar extending through the bore in said core and compressing one wall of said core in clamping the roll to the carrier bar, the rest of said core affording a yielding and resilient base for that portion of the roll engaging the surface to be operated upon.

11. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, elongated carrier bars loosely pivoted at their mid-points to the outer ends of said arms, an elongated stone hone element associated with each of said carrier bars, each hone element having an elongated base plate the ends of which receive fastening means fastening the hone element to the associated carrier bar.

12. A honing device for cylinder bores having radially expressible arms, elongated carrier bars for hones loosely pivoted at their mid-points to the outer ends of said arms, a hone comprising a roll of abrasive sheet material associated with each of said carrier bars, and an elongated clamp bar extending through each roll and receiving means fastening the ends thereof adjustably to the ends of the associated carrier bar to clamp the roll.

13. A device as set forth in claim 12 including a tubular core in each roll made of compressible resilient material, said clamp bar extending through the bore in said core and compressing one wall of said core in clamping the roll to the carrier bar, the rest of said core affording a yielding and resilient base for that portion of the roll engaging the surface to be operated upon.

14. A honing device for cylinder bores comprising a head carrying a plurality of angularly spaced radially expressible arms disposed in a plane normal to the longitudinal axis of rotation of the head, elongated carrier bars for hones loosely pivoted at their mid-points to the outer ends of said arms on transverse axes disposed parallel to the aforesaid plane, pivots connecting the inner ends of said arms to said head on axes parallel to the longitudinal axis of rotation of said head, whereby said arms are swingable in the aforesaid plane, an elongated stone hone element associated with each of said carrier bars, each hone element having an elongated base plate the ends of which receive fastening means fastening the hone element to the associated carrier bar.

15. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, elongated carrier bars loosely pivoted at their mid-points to the outer ends of said arms, a replaceable abrasive unit associated with each of said carrier bars comprising an elongated tubular substantially cylindrical core of soft rubber on which a roll of abrasive sheet material that is approximately as wide as the core is long is wound with the abrasive side out, and an elongated clamp bar extending through each of said cores and receiving means fastening the ends thereof adjustably to the ends of the associated carrier bar to clamp the abrasive unit so that the free end of the roll of abrasive sheet material is gripped firmly, the rubber material of the core being compressed to grip the roll of sheet material resiliently.

16. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, cross-bars on the outer ends of said arms, a roll of abrasive sheet material associated with each of said cross-bars, and an elongated clamp bar extending through each roll and receiving means fastening the ends thereof adjustably to the ends of the associated cross-bar to clamp the roll.

17. A tool as set forth in claim 16, including a tubular core in each roll made of compressible resilient material, said clamp bar extending through the bore in said core and compressing one wall of said core in clamping the roll to the cross-bar, the rest of said core affording a yielding and resilient base for that portion of the roll engaging the surface to be operated upon.

18. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, cross-bars on the outer ends of said arms, an elongated stone hone element associated with each of said cross-bars, each hone element having an elongated base plate the ends of which receive fastening means fastening the hone element to the associated cross-bar.

19. In a tool of the character described, a rotatable head, a plate in assembled coaxial relation to said head and adapted to turn with respect thereto, a drive spindle for the tool extending through a bearing in said head and secured to said plate, elongated arms pivoted at their inner ends on said head for oscillation and projectable from the head substantially radially, guides on said plate slidably engaging the arms intermediate their ends, cross-bars on the outer ends of said arms, a replaceable abrasive unit associated with each of said cross-bars comprising an elongated, tubular, substantially cylindrical core of soft rubber on which a roll of abrasive sheet material that is approximately as wide as the core is long is wound with the abrasive side out, and an elongated clamp bar extending through each of said cores and receiving means fastening the ends thereof adjustably to the ends of the associated cross-bar to clamp the abrasive unit so that the free end of the roll of abrasive sheet material is gripped firmly, the rubber material of the core being compressed to grip the roll of sheet material resiliently.

BERD L. JOHNSON.

REFERENCES CITED

The following references are of record in the file of this patent:

UNITED STATES PATENTS

| Number | Name | Date |
|---|---|---|
| 391,533 | Howard | Oct. 23, 1888 |
| 667,273 | Webster | Feb. 5, 1901 |
| 1,013,911 | Weber | Jan. 9, 1912 |
| 1,474,649 | Storm | Nov. 20, 1923 |
| 1,498,094 | Harter | June 17, 1924 |
| 1,550,807 | Heon | Aug. 25, 1925 |
| 1,577,681 | Blettner | Mar. 23, 1926 |
| 2,448,884 | Hamilton | Sept. 7, 1948 |